United States Patent [19]
Holloway, III et al.

[11] Patent Number: 5,150,875
[45] Date of Patent: Sep. 29, 1992

[54] LINEAR MASS ACTUATOR

[75] Inventors: Sidney E. Holloway, III, Newport News; Edward A. Crossley, Jr., Gloucester Point; Irby W. Jones, Newport News; James B. Miller, Norfolk; C. Calvin Davis, Hampton; Vaughn D. Behun, Hampton; Lewis R. Goodrich, Sr., Hampton, all of Va.

[73] Assignee: The United States of America as represented by the Administrator of the National Aeronautics and Space Administration, Washington, D.C.

[21] Appl. No.: 735,149

[22] Filed: Jul. 22, 1991

[51] Int. Cl.⁵ ............................................ F16M 13/00
[52] U.S. Cl. ..................................... 248/550; 188/378
[58] Field of Search ...................... 248/550, 638, 559; 267/136; 188/378

[56] References Cited

U.S. PATENT DOCUMENTS

| | | |
|---|---|---|
| 4,643,385 | 2/1987 | Sandercock . |
| 4,795,123 | 1/1989 | Forward et al. . |
| 4,796,873 | 1/1989 | Schubert . |
| 5,052,529 | 10/1991 | Sutcliffe et al. ..................... 188/378 |

Primary Examiner—Blair M. Johnson
Attorney, Agent, or Firm—Kevin B. Osborne

[57] ABSTRACT

A linear mass actuator includes an upper housing and a lower housing connectable to each other and having a central passageway passing axially therethrough a mass linearly movable in the central passageway, rollers mounted in the upper and lower housings and being in frictional engagement with the mass, for translating the mass linearly in the central passageway and drive motors operatively coupled to the roller means, for rotating the rollers and thus driving the mass axially in the central passageway.

20 Claims, 6 Drawing Sheets

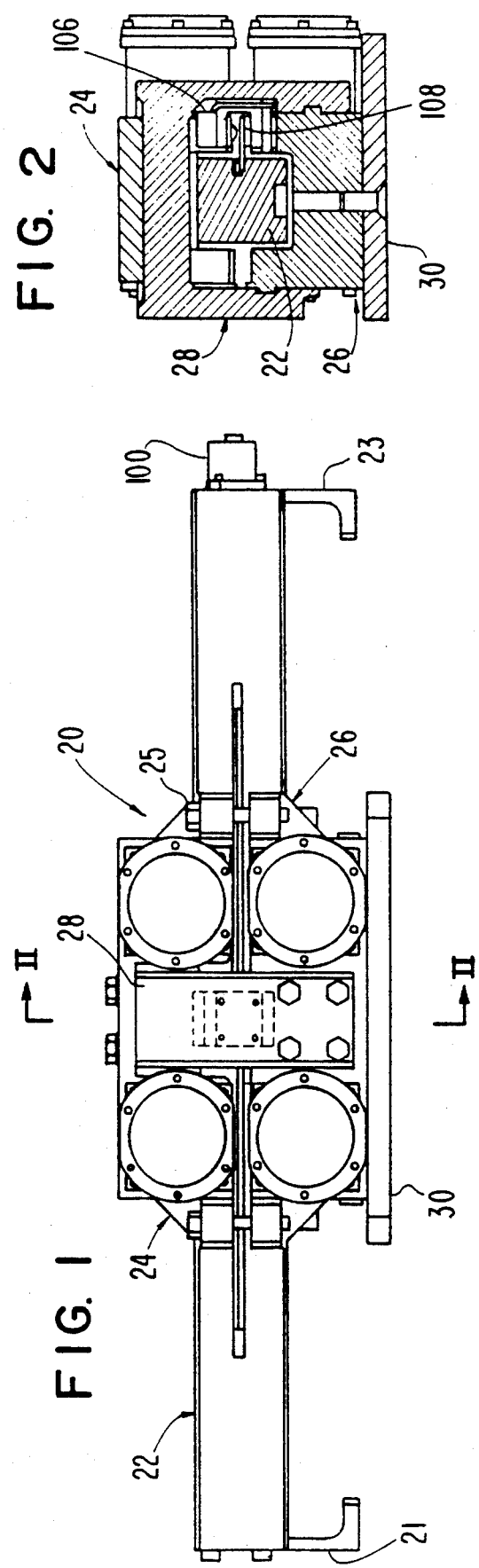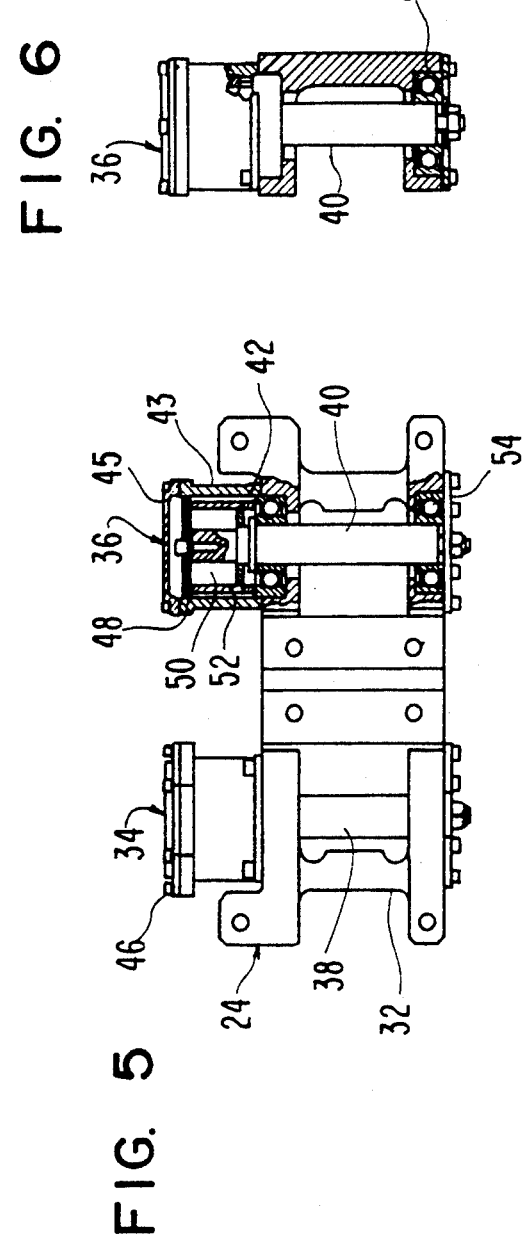

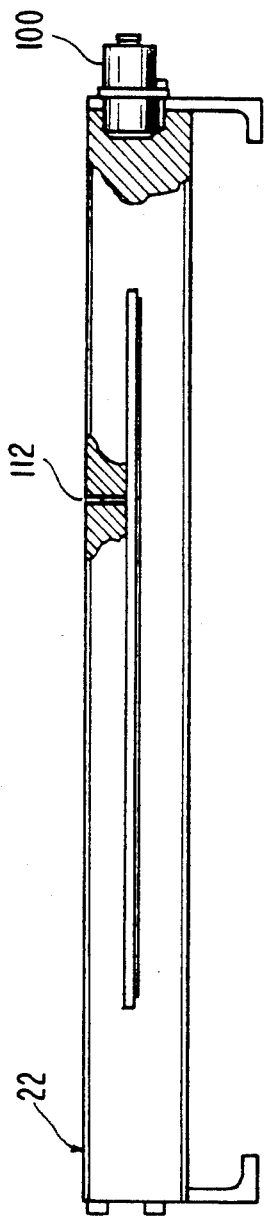
FIG. 12
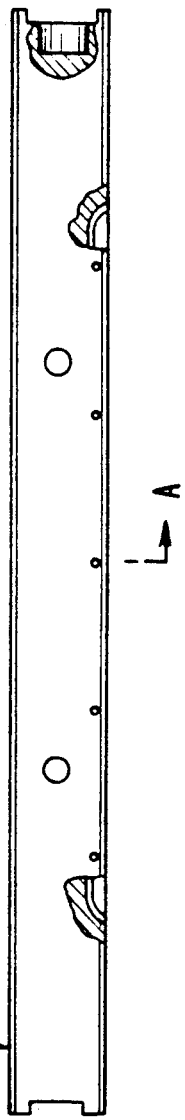
FIG. 13
FIG. 13(a)
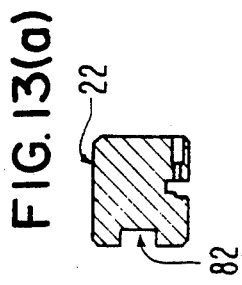
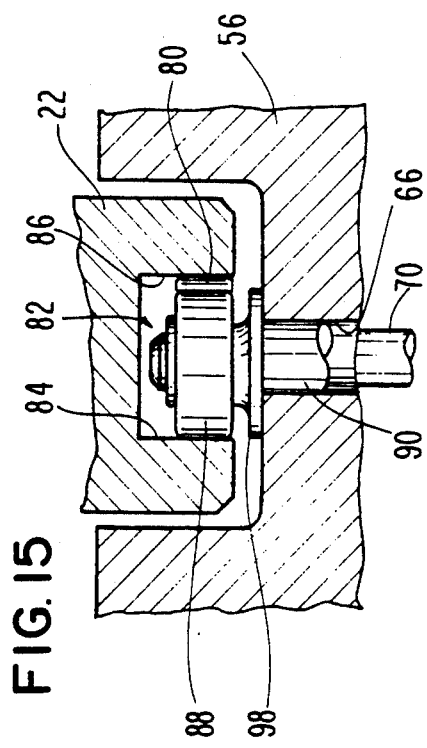
FIG. 15

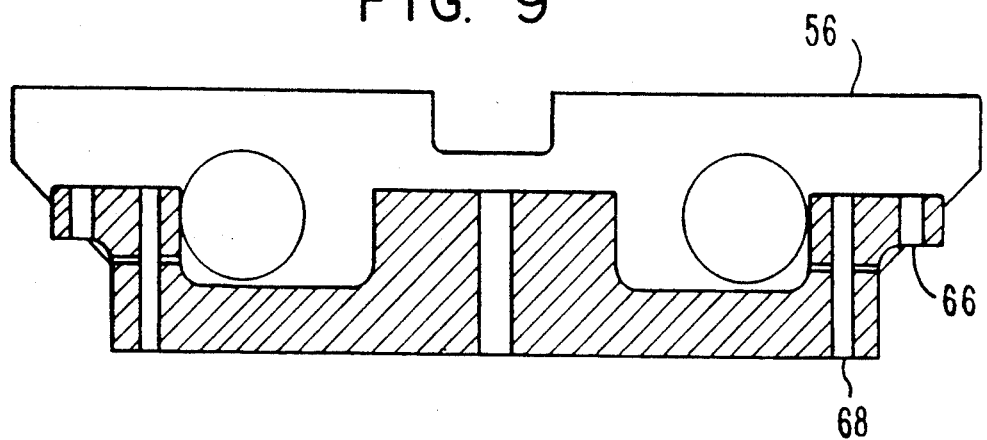
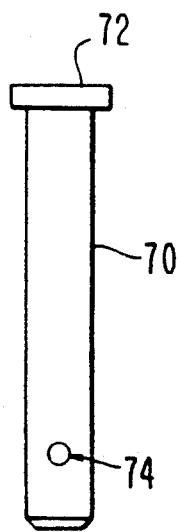
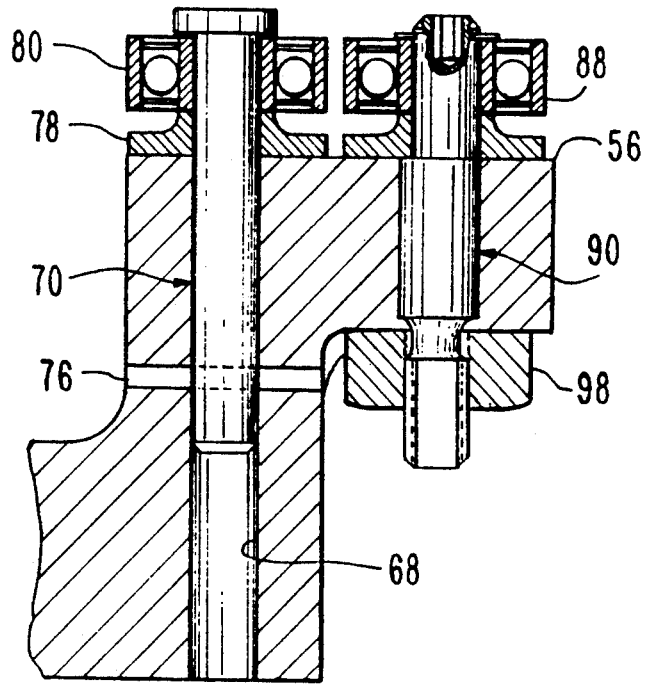
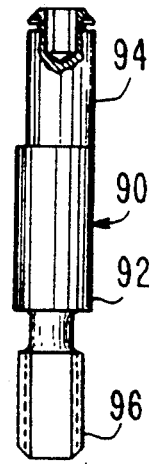

LINEAR MASS ACTUATOR

ORIGIN OF THE INVENTION

The invention described herein was jointly made by Government employees and in the performance of work under a NASA Contract, and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

The present invention relates generally to drive mechanisms and, more specifically, to a friction driven linear mass actuator capable of applying a controlled force to damp out oscillations in an attached structure or to excite oscillations in an attached structure.

2. Description of the Related Art

Vibration dampening can be achieved by controlling the movement of a mass to correspond to vibration induced movement of a corresponding structure. An example is disclosed in U.S. Pat. No. 4,643,385, issued to Sandercock discloses an active vibration dampening apparatus comprising an accelerometer, vibrating transducers, and isolating devices. The object is to actively cancel vibrations in the 2 to 25 Hz range. The output of a piezoelectric transducer is used to drive a speaker coil mounted in the base of the support structure. The control signal is out of phase with the input signal causing the cancellation of vibration. This device is particularly suitable for eliminating low frequency vibrations in sensitive equipment in a building. The mass being damped is necessarily small since the voice coil must support it.

U.S. Pat. No. 4,795,123, issued to Forward et al., discloses a vibrating object with three or more mutually perpendicular accelerometers and associated drivers. The driving actuators are attached to a vibrating structure in three planes and controlled by feedback of the accelerometers.

U.S. Pat. No. 4,796,823, issued to Schubert, describes an active vibration isolation system in which a system uses a velocity-sensitive geophone to sense payload velocity and modifies the signal to control the vibration-opposing force.

All of the aforementioned patents are severely limited in the amount of mass that may be used to reduce vibration because the masses are supported by flexible coils. Also, the devices are limited in frequency range so that they cannot be used to damp very low frequency vibration. Part of the reason for this is that the stroke of the mass for both of the devices described above is limited by having a coil structure.

In the field of aerospace technology, it is sometimes necessary to damp out vibrations in large space structures when they are deployed in the weightless environment of outer space. Also, for the purpose of testing these structures it is sometimes necessary to excite the structure on earth in a controlled test in order to study the dynamics thereof.

Previously used mass actuators for space applications have been driven by belts or gears using pneumatics or linear electric motors. Harris Corporation, for example, developed a linear actuator where magnets were affixed to the mass which passed through a linear motor. Beltac Corporation has developed a pneumatic belt driven actuator. However, the flexibility of a belt system prohibits accurate motion of the actuator due to the elasticity of the belt. The Harris design is also limited in terms of the amount of force that can be applied by the mass due to the type of motor used. Moreover, linear motors are susceptible to cogging effects which would severely limit their ability to function properly. A need exists for a mass actuator having a drive mechanism which is extremely accurate and capable of producing an offsetting oscillatory motions in response to sensed accelerations to actively damp out vibration and exciting oscillatory motions to test responses of structures in space and during ground testing on earth.

SUMMARY OF THE INVENTION

An object of the present invention is therefore to provide a linear mass actuator capable of damping out oscillations in a space structure, or other large structures subject to low frequency vibration.

Another object of the present invention is to provide a linear mass actuator capable of high accelerations and smooth travel of the mass.

Another object of the present invention is to provide a linear mass actuator which eliminates the use of gears and belts which in the past have resulted in inaccuracies due to loose fitting.

Still another object of the present invention is to provide a linear mass actuator which has reduced cogging effects during actuator travel and increased force capability.

Yet another object of the present invention is to provide a linear mass actuator having various modes of operation so as to achieve variability as to stroke length, acceleration (force) and velocity.

Another object of the present invention is to provide damping and exciting in the zero gravity environment of space but also in the gravity environment of earth without alteration to the design.

These and other objects of the invention are met by providing a linear mass actuator which includes an upper housing and a lower housing connectable to each other and having a central passageway extending axially therethrough, a mass linearly movable in the central passageway, roller means, mounted in the upper and lower housings and being in frictional engagement with the mass, for translating the mass linearly in the central passageway, and drive means operatively coupled to the roller means for driving the roller means and thus translating the mass in both forward and reverse directions linearly.

These and other features and advantages of the linear mass actuator of the present invention will become more apparent with reference to the following detailed description and drawings.

BRIEF DESCRIPTION OF THE DRAWINGS

FIG. 1 is a side elevational view of a linear mass actuator according to the present invention;

FIG. 2 is a sectional view taken along line II—II of FIG. 1;

FIG. 5 is a plan view, partly in section, of the upper housing assembly of the linear mass actuator according to the present invention;

FIG. 6 is a transverse sectional view of the upper housing assembly of FIG. 5;

FIG. 9 is a longitudinal sectional view of the lower housing;

FIG. 10 is a plan view of an adjustable shaft used in the linear mass actuator of the present invention;

FIG. 10(a) is an end view of the adjustable shaft of FIG. 10;

FIG. 11 is a plan view of a fixed shaft used in the linear mass actuator of the present invention;

FIG. 12 is a side elevational view, partly cut away, of the mass of the linear mass actuator of the present invention;

FIG. 13 is a side elevational view of the mass of FIG. 12, turned 90° from the view of FIG. 12 i.e., a top or bottom view;

FIG. 13(a) is a sectional view taken along line A—A of FIG. 13;

FIG. 14 is an enlarged, sectional view of a portion of the lower housing showing guide rollers at one end thereof;

FIG. 15 is an enlarged end view, showing the relationship between the mass and the guide rollers;

DETAILED DESCRIPTION OF THE PREFERRED EMBODIMENTS

Figure 3:
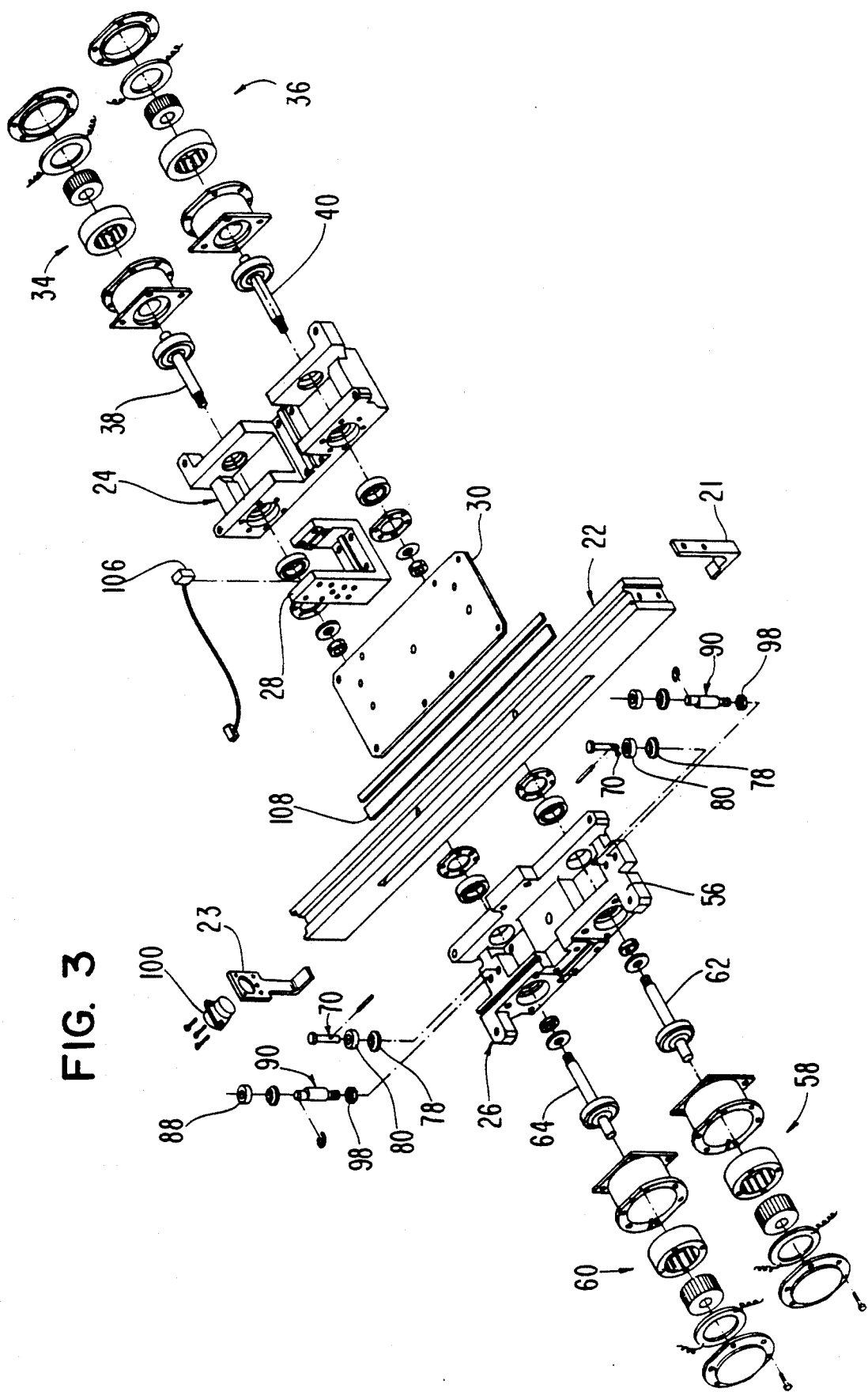
FIG. 3 is an exploded view of the linear mass actuator of FIG. 1.
Figure 4:
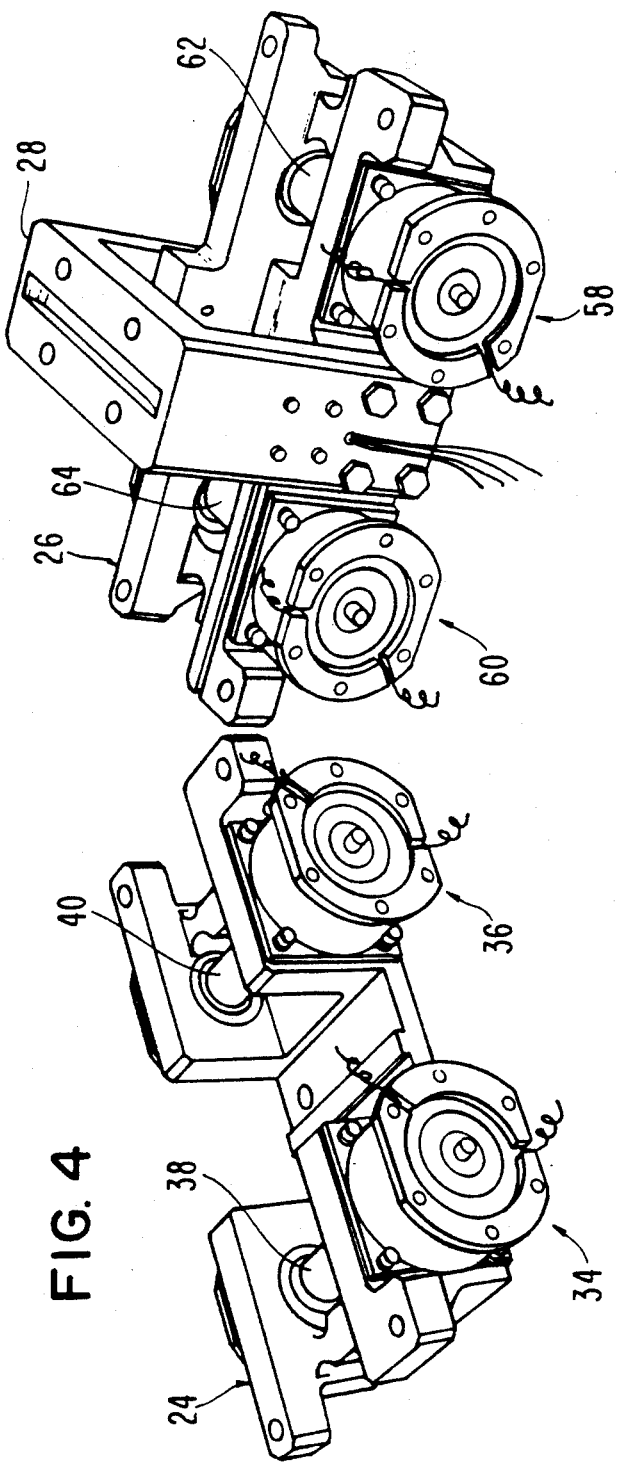
FIG. 4 is a perspective view showing two sub-assemblies of the linear mass actuator of FIG. 1.
Figure 8:
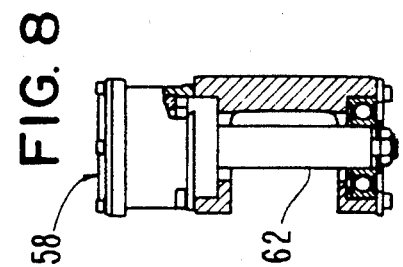
FIG. 8 is a transverse sectional view through the lower housing assembly of FIG. 7.
Figure 7:
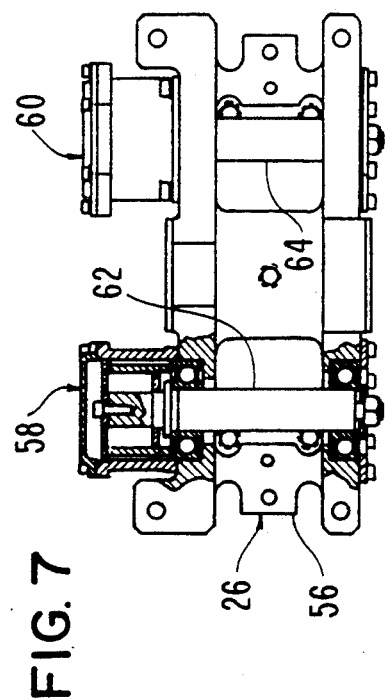
FIG. 7 is a top plan view, partly in section, of the lower housing of the linear mass actuator of the present invention.

Referring to FIG. 1, a linear mass actuator is generally referred to by the numeral 20 and includes a mass 22, an upper housing assembly 24 and a lower housing assembly 26. The two assemblies 24 and 26 are connected to each other through a central support member 28 located in a medial area of the two housing assemblies. The mass 22 is movable linearly in a central passageway formed between the two housing assemblies, as shown in FIG. 2. The lower housing assembly 26 is connected to a base plate 30, which is connectable to a structure which may be subjected to vibratory motion. The structure to which the base plate 30 is attached may also be a structure which is to be tested and therefore one which the linear mass actuator will be used to create vibration.

The mass 22 is caused to move in the passageway by roller means, which are mounted in the upper and lower housing assemblies and which are in friction engagement with the mass 22, and drive means which are operably coupled to the roller means for driving the mass linearly in the central passageway in forward and reverse directions for reciprocating or oscillating movement.

Referring to FIGS. 5 and 6, the upper housing assembly 24 includes a upper housing 32, and a pair of DC torque motors 34 and 36, each of which rotatably drives a shaft 38 and 40, respectively. The shafts 38 and 40 are journalled in opposite sides of the upper housing 32 by means of bearings 42 and 44. Each torque motor includes a motor housing 43, and a cap 45 held on the housing by a plurality of cap screws 46. A stator retainer 48 positions and retains a stator 57 which together with a rotor 50 produces the electromotive force which drives the respective shafts 38 and 40. Bearing plates 54 are disposed on the sides of the upper housing 24 opposite the motors 34 and 36.

Similarly, the lower housing assembly 26 includes a lower housing 56 and a pair of DC torque motors 58 and 60 which impart rotary motion in the shafts 62 and 64, respectively. The internal parts of the motors 58 and 60 are identical to the torque motors 34 and 36. The two shafts 62 and 64 frictionally engage a lower surface of the mass 22 while the shafts 38 and 40 frictionally engage an upper surface thereof. The shafts 62 and 64 rotate in the same direction. The shafts 38 and 40 also rotate in the same direction, but opposite the direction of the shafts 62 and 64. Thus, with reference to FIG. 1, with the two upper shafts 38 and 40 rotating clockwise and the two lower shafts 62 and 64 rotating counterclockwise, the mass 22 would move to the left of FIG. 1. Similarly, if the upper shafts and lower shafts reverse direction, the mass 22 would move to the right of FIG. 1. The motors can be controlled according to the present invention to cause the mass 22 to move in any length of stroke (as limited by the length of the mass 22), at a desirable velocity and at a desirable frequency of oscillation to provide either an offsetting movement to damp out vibration, or an exciting movement to generate vibration in a test structure. Thus, axial movement of the mass 22 is dictated by the controlled energizing of the four DC torque motors 34, 36, 58 and 60.

It is important to prevent lateral movement of the mass 22 while at the same time not providing resistance to axial movement. Thus, the present invention includes lateral guide means for preventing lateral movement of the mass 22 during axial movement of the mass. The lateral guide means are mounted on the lower housing 56 in a pair of bores 66 and 68 provided at each of the opposite ends of the lower housing 56. The inner-most bore 68 receives a pivot shaft 70 (FIG. 11) which has a head 72 on one end and a pin hole 74 provided near the opposite end. As shown in FIG. 14, the pivot shaft 70 is inserted into the bore 68 and a pin 76 passes transversely through the pivot shaft 70 through the pin hole 74 so as to lock the pivot shaft 70 in position so that the headed end extends upwardly into the central passageway defined between the upper and lower housings. A guide bearing spacer 78 positions a precision ball bearing 80 from the surface of the lower housing 56, thereby mounting the precision ball bearing 80 in a position to engage a square groove formed in the lower surface of the mass 22. The square groove, illustrated in FIG. 13(a) and designated numeral 82 has a pair of vertical side surfaces 84 and 86, as shown in FIG. 15. The precision ball bearing 80 is fixed in position to engage the side surface 84 with its cylindrical outer surface. The precision ball bearing 80 is a ball bearing of suitable size to fit on the pivot shaft 70 through its central bore, while the outside diameter of the bearing is selected to fit within the groove 82 so as to only engage one of the two side surfaces 84 and 86.

A second precision ball bearing 88 engages the other side surface 86 so that the two ball bearings 80 and 88 prevent lateral motion of the mass 22 during its axial movement. The precision ball bearing 88 is similar to the precision ball bearing 80 except that it is mounted on an adjustable shaft 90. The adjustable shaft 90, illustrated in greater detail in FIGS. 10 and 10(a), has a central portion 92 having a diameter substantially corresponding to the inner diameter of the bore 66. A ball bearing mounting end portion 94 is eccentric with respect to the central portion 92, while the opposite end portion 96 is threaded but coaxial with the central portion 92.

The adjustable shaft 90 is capable of adjusting the lateral position of the precision ball bearing 88 by loosening a nut 98 and then turning the shaft with an allen wrench engaging a socket machined in the eccentric end portion 94. The shaft 90 can be turned until the roller cylindrical surface engages the vertical surface 86 of the square groove 82.

With two sets of guide bearings, one set provided at each axial end of the lower housing, the mass 22 is prevented from moving laterally without prohibiting axial movement in the passageway.

The linear mass actuator as described above represents a unique departure from the prior art in that it avoids gears and belts and linear electric motors which tend to suffer from cogging effects. During assembly of the present invention, the central support member 28 is bolted to the lower housing assembly 26. The mass 22 is then positioned on the shafts 62 and 64 of the lower housing assembly 26. The upper housing assembly 24 is then positioned on the center support with the upper housing shafts 38 and 40 resting on the upper surface of the mass 22. The upper and lower housing assemblies are then bolted together which provides the clamping force necessary to produce the required amount of frictional force between the shafts and the mass 22. The upper and lower housing assemblies and the central support member 28 are provided with slots and grooves which key the various parts in precise positions. Clamping bolts 25 pass through aligned holes provided in flanges of the upper and lower housing and are threadedly engaged therein. Torque settings on the clamping bolts 25 can be selected to provide a desired amount of frictional engagement between the shafts and the mass. The shafts and the mass 22 are of dissimilar metals to prevent galling. The DC torque motors which fit on the ends of the shafts rotate the shafts to thereby translate the mass linearly. All of the parts of the linear mass actuator are designed to very close tolerances, and the shafts and the mass must maintain contact at all times. A pair of stops 21 and 23 are connected to the opposite ends of the mass 22 to limit the stroke length of travel for the mass 22 in either direction.

One possible use for the linear mass actuator of the present invention is in vibration damping system such as one that could be used in outer space to damp out vibrations experienced by a space structure, such as a boom or truss. An accelerometer 100 is connected to one of the ends of the mass 22 in order to sense motion or acceleration of the mass. The accelerometer 100 is a servo accelerometer which is essentially a null-balance transducer. Displacement of the mass is detected by the accelerometer and an output signal is the error signal in the servo system. This signal is fed to a controller 102, which also receives a mass position signal from an encoder 104. The encoder 104 includes a receiving head 106 which is mounted on the central support member 28. The receiving head transmits light through a glass bar 108 which is mounted in a groove 110 provided in the side of the mass 22. The bar 108 is fixed in position by set screws 112 which extend through bores formed in the mass 22 (see FIGS. 12, 13 and 13(a)). The bar is chrome plated to have incremental lines which are detected by the receiving head 106. The receiving head 106 thus outputs a signal to the controller 102 corresponding to the mass position, whereas the accelerometer 100 outputs a signal corresponding to the mass acceleration. The receiving head and glass bar are commercially available and manufactured by Teledyne-Gurly of Troy, New York. The accelerometer 100 is also commercially available from Systron-Donner of Concord, California.

Figure 16:
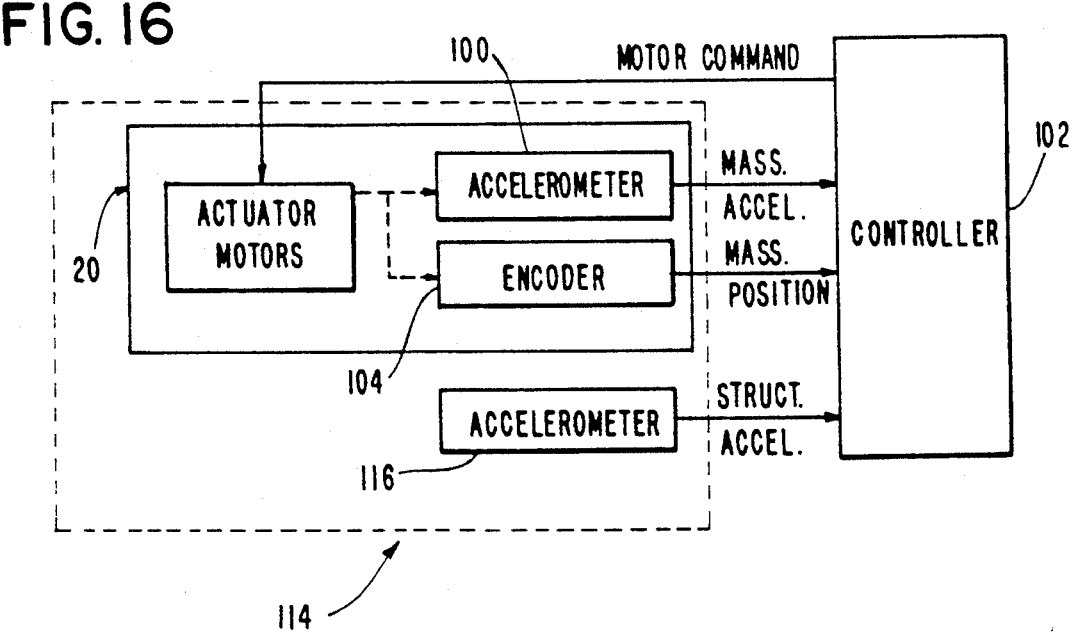
FIG. 16 is a block diagram showing a system incorporating the linear mass actuator of the present invention.

A basic vibration dampening system using the linear mass actuator of the present invention is illustrated in FIG. 16, whereby the linear mass actuator 20 is part of the system and is connected to a structure 114 which may be subjected to vibration. A second accelerometer 116 is mounted on the structure 114 for the purpose of sensing structural accelerations. A signal indicative of structure acceleration is also fed to the controller 102 along with the mass acceleration signal and the mass position signal. Based on these input signals, the controller outputs a motor command signal to the actuator motors of the linear mass actuator 20. The motor command signal causes a restoring force to be equal to and opposite to the acceleration-induced force so as to in effect damp out vibration.

The system described above with respect to FIG. 16 is a minimum system configuration in which a single linear accelerometer (single degree of freedom) senses motion of the structure. Electrical signals are generated in proportion to acceleration of the structure and are sent to the controller which, using the accelerometer and encoder outputs, produces a voltage command to the motors to exert a force on the structure opposing the motion.

Figure 17:
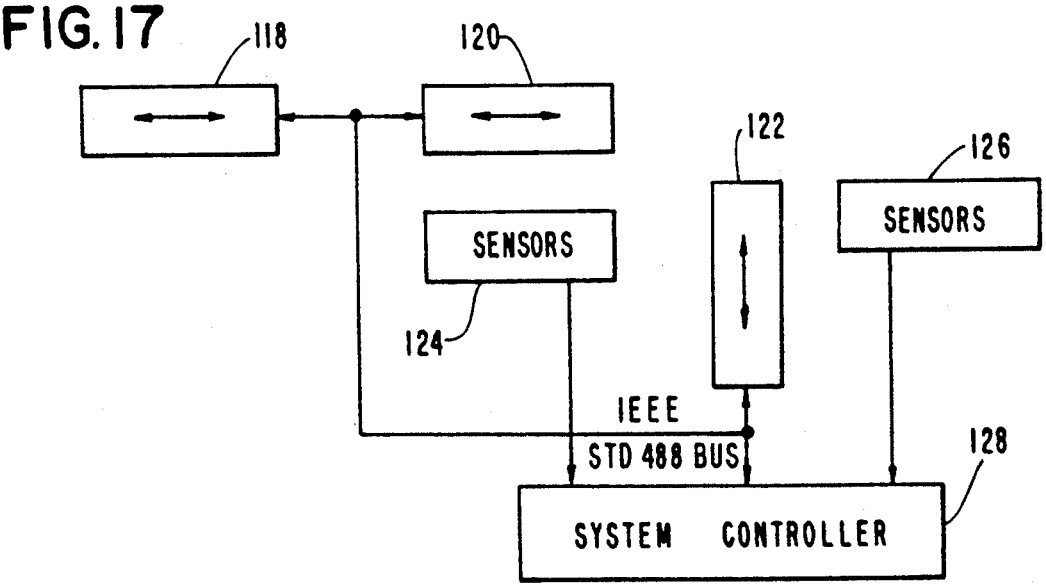
FIG. 17 is a block diagram of a system incorporating a plurality of linear mass actuators according to the present invention.

In the system of FIG. 17, multiple linear mass actuators 118, 120 and 122 are used with controllers. A plurality of sensors 124 and 126 detect motion of the structure. These sensors may be of various types, such as rate gyros, accelerometers, and angular accelerometers. Electrical signals proportional to the motion are transmitted to a system controller 128 which computes desired actuator outputs from all sensor inputs. The system controller 128 transmits commands to the controllers of the individual actuators 118, 120 and 122 through a bus, such as IEEE-488. The controllers of the individual actuators, using the accelerometer and encoder outputs, produces voltage commands to the motors to exert the desired force on the structure.

The linear mass actuator of the present invention can be used in space or on earth to damp out vibrations. It can also be used to provide an exciting force to a structure on earth as well as in space for testing. In either case, varying the size of the motors, the mass, the length of stroke and changing the control characteristics of the actuator allows a great deal of flexibility with respect to the amount of damping force which can be imparted in a corresponding structure.

Numerous modifications and adaptations of the present invention will be apparent to those so skilled in the art and thus, it is intended by the following claims to cover all such modifications and adaptations which fall within the true spirit and scope of the invention.

What is claimed is:

1. A linear mass actuator comprising:
    an upper housing and a lower housing connectable to each other and having a central passageway passing axially therethrough;
    a mass linearly movable in the central passageway;
    roller means, mounted in the upper and lower housings and being in frictional engagement with the mass, for translating the mass linearly in the central passageway; and drive means, operatively coupled to the roller means, for rotating the roller means and thus driving the mass axially in the central passageway.

2. A linear mass actuator according to claim 1, wherein the drive roller means comprises first and second drive rollers journalled in the upper housing, and third and fourth drive rollers journalled in the lower housing, each of the first, second, third and fourth drive rollers having a cylindrical outer surface, and wherein the mass has a flat upper surface and a flat lower surface, and the first and second drive rollers frictionally engage the flat upper surface and the third and fourth drive rollers frictonally engage the flat lower surface of the mass.

3. A linear mass actuator according to claim 2, wherein the drive means comprises first, second, third and fourth D.C. torque motors coupled respectively to the first, second, third and fourth drive rollers.

4. A linear mass actuator according to claim 1, further comprising guide means disposed in the central passageway for preventing lateral movement of the mass during linear actuation.

5. A linear mass actuator according to claim 4, wherein the guide means cooperate with a guide groove formed in the mass.

6. A linear mass actuator according to claim 5, wherein the guide means comprises first and second pairs of guide bearings.

7. A linear mass actuator according to claim 6, wherein the guide groove formed in the mass is a square groove having first and second vertical surfaces, and wherein each of the first and second pairs of guide bearings includes a positionally fixed guide bearing engaging the first vertical surface and a positionally adjustable guide bearing engaging the second vertical surface of the square groove of the mass.

8. A linear mass actuator according to claim 7, wherein the positionally fixed guide bearing is mounted on a positionally fixed pivot shaft extending into the central passageway.

9. A linear mass actuator according to claim 7, wherein the positionally adjustable guide bearing is mounted on an eccentric pivot shaft.

10. A linear mass actuator according to claim 7, wherein the positionally fixed guide bearing and the positionally adjustable guide bearing are each rotatable bearings.

11. A vibration damping system comprising:
a linear mass actuator including an upper housing and a lower housing connectable to each other and having a central passageway passing axially therethrough, a mass linearly movable in the central passageway, roller means, mounted in the upper and lower housings and being in frictional engagement with the mass, for translating the mass linearly in the central passageway, and drive means operatively coupled to the roller means for rotating the roller means and thus driving the mass axially in the passageway, wherein the linear mass actuator is mounted on a structure subjected to vibration;
a first accelerometer mounted on the mass and producing an output signal indicative of mass accelerations;

a second accelerometer mounted on the structure near the linear mass actuator and producing an output signal indicative of structure accelerations;
position detector means associated with the mass for producing a signal indicative of mass position; and
a controller receiving the signals of the first and second accelerometers and outputting a drive command signal to the drive means to cause the mass to generate a force that opposes structure accelerations.

12. A vibration damping system according to claim 11, wherein the drive roller means comprises first and second drive rollers journalled in the upper housing, and third and fourth drive rollers journalled in the lower housing, each of the first, second, third and fourth drive rollers having a cylindrical outer surface, and wherein the mass has a flat upper surface and a flat lower surface, and the first and second drive rollers frictionally engage the flat upper surface and the third and fourth drive rollers frictionally engage the flat lower surface of the mass.

13. A vibration damping system according to claim 12, wherein the drive means comprises first, second, third and fourth D.C. torque motors coupled respectively to the first, second, third and fourth drive rollers.

14. A vibration damping system according to claim 11, further comprising guide means disposed in the central passageway for preventing lateral movement of the mass during linear actuation.

15. A vibration damping system according to claim 14, wherein the guide means cooperate with a guide groove formed in the mass.

16. A vibration damping system according to claim 15, wherein the guide means comprises first and second pairs of guide bearings.

17. A vibration damping system according to claim 16, wherein the guide groove formed in the mass is a square groove having first and second vertical surfaces, and wherein each of the first and second pairs of guide bearings includes a positionally fixed guide bearing engaging the first vertical surface and a positionally adjustable guide bearing engaging the second vertical surface of the square groove of the mass.

18. A vibration damping system according to claim 17, wherein the positionally fixed guide bearing is mounted on a positionally fixed pivot shaft extending into the central passageway.

19. A vibration damping system according to claim 17, wherein the positionally adjustable guide bearing is mounted on an eccentric pivot shaft.

20. A vibration damping system comprising:
a plurality of linear mass actuators, each including a linear mass actuator including an upper housing and a lower housing connectable to each other and having a central passageway passing axially therethrough, a mass linearly movable in the central passageway, roller means, mounted in the upper and lower housings and being in frictional engagement with the mass, for translating the mass linearly in the central passageway, and drive means operatively coupled to the roller means for rotating the roller means and thus driving the mass axially in the passageway, wherein the linear mass actuator is mounted on a structure subjected to vibration, a first accelerometer mounted on the mass and producing an output signal indicative of mass accelerations, position detector means associated with the mass for producing a signal indicative of mass position, and a controller receiving the signals of the first and second accelerometers and outputting a drive command signal to the drive means to cause the mass to generate a force that opposes structure accelerations;

a plurality of sensors disposed on the structure for sensing types of movement of the structure; and a system controller, receiving input signals from the plurality of sensors and receiving mass acceleration and position signals from each of the plurality of linear mass actuators, and outputting control signals to each of the linear mass actuators in response to the motion detected by the plurality of sensors.

* * * * *